United States Patent [19]

McPherson et al.

[11] Patent Number: 5,419,579
[45] Date of Patent: May 30, 1995

[54] FOLDED AIR BAG

[75] Inventors: William G. McPherson, Grand Blanc; Gary R. LaLonde, Clinton Township, Macomb County; Kevin J. Boxey, Detroit, all of Mich.

[73] Assignee: TRW Vehicle Safety Systems Inc., Lyndhurst, Ohio

[21] Appl. No.: 266,928

[22] Filed: Jun. 27, 1994

[51] Int. Cl.⁶ .................................. B60R 21/20
[52] U.S. Cl. .................................. 280/743.1
[58] Field of Search ............... 280/743 R;730 R, 731, 280/732

[56] References Cited

U.S. PATENT DOCUMENTS

| | | | |
|---|---|---|---|
| 3,618,979 | 11/1971 | Gulette | 280/731 |
| 4,004,828 | 1/1977 | Sogabe et al. | 280/743 R |
| 4,235,453 | 11/1980 | Lawson et al. | 280/743 R |
| 4,351,544 | 9/1982 | Ross | 280/743 R |
| 5,205,583 | 4/1993 | Henseler et al. | 280/743 R |
| 5,324,070 | 6/1994 | Kitagawa et al. | 280/730 R |

*Primary Examiner*—Kenneth R. Rice
*Attorney, Agent, or Firm*—Tarolli, Sundheim & Covell

[57] ABSTRACT

A folded air bag (10) is made from a panel (40) of fabric material which is folded and sewn to define an inflation fluid volume. The panel (40) is sewn along stitching lines (110, 120) which extend at an angle other than 90° to fold lines (170, 172, 174, 200, 202) and which intersect the fold lines. Thus, when the panel (40) is folded along the fold lines (170, 172, 174, 200, 202), the stitching lines (110, 120) are folded into portions (190-196, 220-224, 230-236, 240-244) which are not in overlying relationship with each other and which are spaced apart from each other. This minimizes the thickness of the folded air bag (10).

16 Claims, 5 Drawing Sheets

FOLDED AIR BAG

BACKGROUND OF THE INVENTION

1. Technical Field

The present invention relates to an inflatable vehicle occupant restraint, and is particularly directed to an air bag made from one or more panels of fabric material sewn in a manner to minimize the volume of the air bag when in a folded condition.

2. Description of the Prior Art

A typical air bag module includes an air bag made from one or more panels of fabric material sewn to define an inflation fluid volume. In the process of sewing the air bag, stitching lines are used to join layers of material at seams. After the air bag is sewn, it is folded to fit into a housing along with an inflator to form the module. The module is mounted in a vehicle. In the event of a vehicle collision, the inflator is actuated to direct inflation fluid into the air bag. The air bag inflates from the folded and stored condition to an unfolded and inflated condition to restrain the vehicle occupant.

An air bag module which is used to restrain a front seat passenger of a vehicle is disposed in the vehicle instrument panel. The space available for an air bag module is limited in this location. Thus, it is desirable to minimize the space occupied by the folded air bag as part of the air bag module.

The stitching lines of an air bag increase the thickness of the air bag when folded. Thus, the air bag is generally thicker at locations where a stitching line is present than at locations where there is no stitching line. The thickness of a folded air bag is undesirably increased where a series of stitching lines are disposed in overlying relationship with each other.

SUMMARY OF THE INVENTION

The present invention is an inflatable restraint for use with a source of inflation fluid and for, when inflated, restraining a passenger of a vehicle. The restraint includes a panel of fabric material having first and second opposite end portions and first and second opposite side portions. The panel is folded along spaced apart first fold lines, with the first end portion of the panel overlying the second end portion. A first stitching line joins the first and second end portions of the panel. The panel including the first stitching line is folded along spaced apart second fold lines extending at an acute angle to the first stitching line. The second fold lines define a plurality of folded portions of the panel which overlie each other and which are in abutting engagement with each other. The second fold lines also define a plurality of folded portions of the first stitching line which are spaced apart from each other and not in overlapping alignment with each other.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

Figure 1:
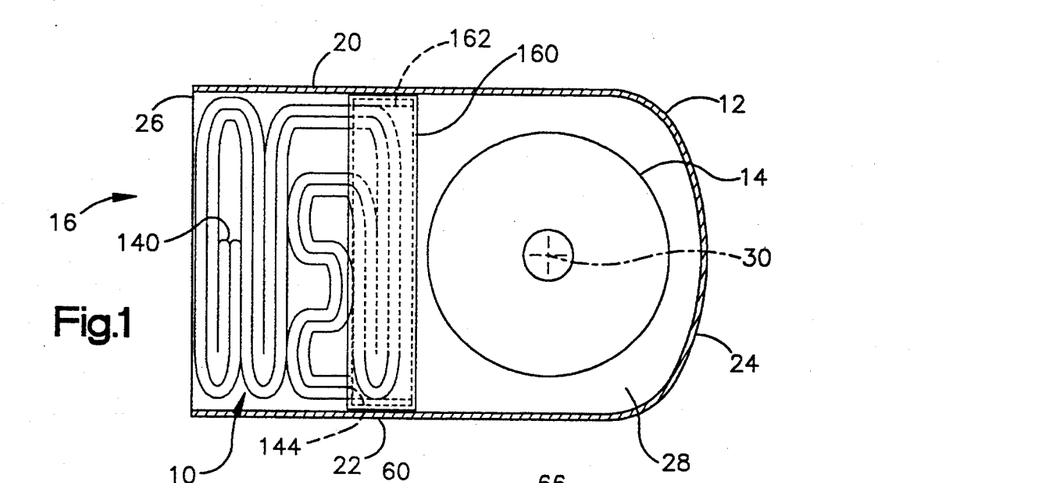
FIG. 1 is a schematic transverse sectional view of an air bag module including an air bag constructed in accordance with the present invention.

The present invention relates to an inflatable vehicle occupant restraint, and is particularly directed to an air bag for restraining a vehicle occupant in the event of sudden vehicle deceleration such as occurs in a vehicle collision. The present invention is applicable to various inflatable restraint constructions. As representative of the present invention, FIG. 1 illustrates an air bag 10.

The air bag 10 is folded and stored in a housing 12 along with an inflator 14. The inflator 14, which is illustrated only schematically in cross-section, has an elongate cylindrical shape. Opposite ends of the inflator 14 are secured to opposite side walls (not shown) of the housing 12. The air bag 10, the housing 12, and the inflator 14 together form a vehicle safety apparatus or air bag module 16.

The housing 12 is made of sheet metal and includes parallel generally planar upper and lower walls 20 and 22. The housing 12 further includes a curved central wall 24 extending between and interconnecting the upper wall 20 and the lower wall 22 to form the C-shaped cross-sectional configuration shown in FIG. 1. The edges of the housing upper and lower walls 20 and 22 and the side walls (not shown) define an opening 26 in the housing 12 opposite the central wall 24. The housing walls also define a chamber 28 in the housing 12. An axis 30 of the air bag module 16 extends longitudinally between the side walls of the housing 12.

The air bag module 16 includes means (not shown) for securing the housing 12 to a portion of the vehicle such as the vehicle instrument panel. The vehicle safety apparatus 16 also includes a cover (not shown) which closes the opening 26 into the housing 12. The cover is preferably made of a suitable plastic and may form a portion of the vehicle instrument panel.

In a preferred embodiment, the air bag 10 is made from a single panel 40 (FIG. 2) of fabric material, preferably woven nylon, which is folded and sewn to form the air bag. The panel 40 (FIG. 2) is generally rectangular in configuration. Two side edges 50 and 52 of the panel 40 extend parallel to a longitudinal axis 54 of the panel. A transverse axis 56 of the panel 40 extends perpendicular to the longitudinal axis 54. The panel 40 has a first end portion 42 and a second end portion 44, which are disposed on opposite sides of the transverse axis 56. The transverse axis 56 extends through an intermediate portion 102 of the panel 40 which is disposed between the end portions 40 and 42. The panel 40 also has left and right portions (as viewed in FIG. 2), which are disposed on opposite sides of the longitudinal axis 54 and which include left and right portions, respectively, of the first and second end portions 42 and 44 and the intermediate portion 102.

Figure 2:
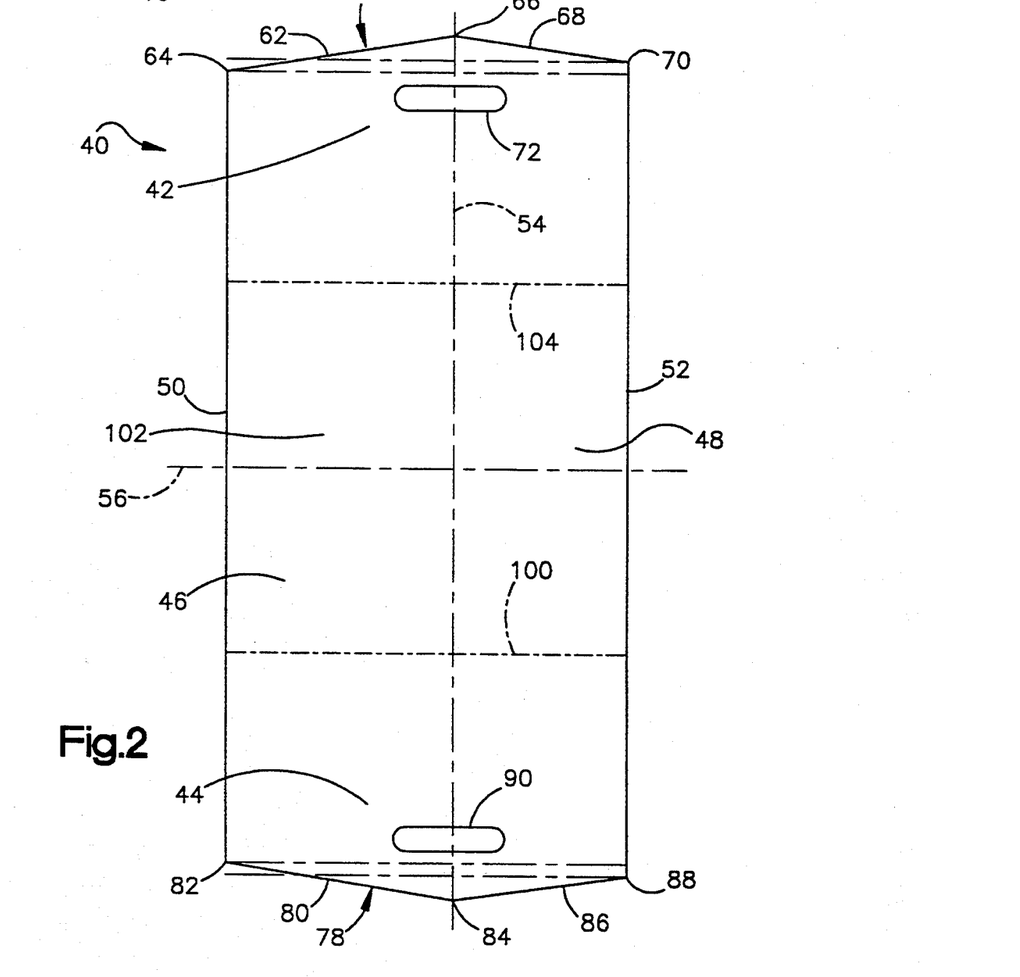
FIG. 2 is a plan view of a panel of fabric material in a condition prior to being folded and sewn to make the air bag of FIG. 1.

A first end edge 60 of the panel 40 extends between and interconnects the side edges 50 and 52. The first end edge 60 is substantially shorter than the side edges 50 and 52. A first portion 62 of the first end edge 60 extends in a straight line between a first apex 66 of the panel 40 and a corner 64 at an end of the side edge 50. A second portion 68 of the first end edge 60 extends in a straight line between the first apex 66 and a corner 70 at an end of the side edge 52. Each of the edge portions 62 and 68 extends at an acute angle, preferably about 10°, to the transverse axis 56. The edge portions 62 and 68 are closest to the transverse axis 56 at the corners 64 and 70 and farthest from the transverse axis at the first apex 66. An elongate inflation fluid opening 72 is formed in the first end portion 42 of the panel 40, at a location adjacent to the first end edge 60.

The second end portion 44 of the panel 40 is a mirror image, about the transverse axis 56, of the first end portion 42. The second end portion 44 is bounded by a second end edge 78 of the panel 40 which extends between and interconnects the side edges 50 and 52. The second end edge 78 is the same length as the first end edge 60 and is substantially shorter than the side edges 50 and 52. The second end edge 78 includes a first portion 80 which extends in a straight line between a corner 82 at an end of the side edge 50 and a second apex 84. A second portion 86 of the second end edge 78 extends in a straight line between the second apex 84 and a corner 88 at the end of the side edge 52. Each of the edge portions 80 and 86 extends at an acute angle, preferably about 10°, to the transverse axis 56. An elongate inflation fluid opening 90 is formed in the second end portion 44 at a location adjacent to the second end edge 78. The inflation fluid openings 72 and 90 are centered laterally on the longitudinal axis 54 which extends through the upper apex 66 and the lower apex 84 of the panel 40.

Figure 3:
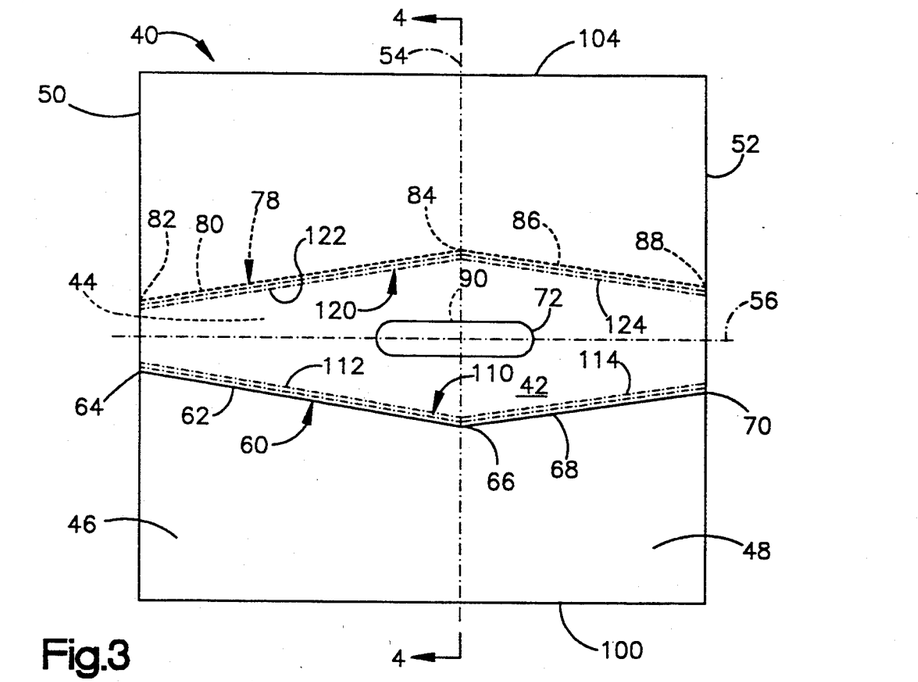
FIG. 3 is a plan view of the panel of FIG. 2 after an initial folding step in which the end portions of the panel are folded and sewn together.
Figure 4:
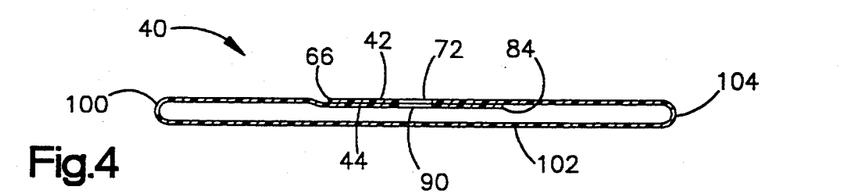
FIG. 4 is a sectional view taken along line 4—4 of FIG. 3.

FIGS. 3 and 4 illustrate the condition of the panel 40 after a first step in the process of folding the panel 40 to make the air bag 10. In this first folding step, the panel 40 is folded along a fold line 100 (FIGS. 2 and 4) extending parallel to the transverse axis 56. The fold line 100 is disposed between the second end portion 44 of the panel 40 and the intermediate portion 102 of the panel. The end portion 44 pivots relative to the intermediate portion 102, about the fold line 100, to a position overlying the intermediate portion. The panel 40 is also folded along a fold line 104 which extends parallel to the fold line 100 between the first end portion 42 of the panel and the intermediate portion 102 of the panel. The first end portion 42 of the panel 40 pivots relative to the intermediate portion 102, about the fold line 104, to a position overlying the intermediate portion 102 and overlying the second end portion 44. The inflation fluid opening 72 in the first end portion 42 of the panel 40 is aligned with and overlies the inflation fluid opening 90 in the second end portion 44 of the panel.

Next, the first end portion 42 of the panel 40 is sewn to the second end portion 44 with two double needle stitching lines 110 and 120. The stitching lines 110 and 120 extend across the width of the panel 40 between the side edges 50 and 52. The stitching line 110 joins the first end portion 42 of the panel 40 to the second end portion 44 of the panel at a location adjacent to the first end edge 60. The stitching line 110 has a first section 112 including a series of stitches arranged in a straight line which extends from the corner 64, along the panel edge portion 62, to the apex 66. The stitching line 110 also has a second section 114 including a series of stitches arranged in a straight line which extends from the apex 66, along the edge portion 68, to the corner 70.

In a similar manner, the double needle stitching line 120 joins the end portions 42 and 44 of the panel 40 at a location adjacent to the second end edge 78 of the panel. The stitching line 120 includes a first section 122 having a series of stitches arranged in a straight line which extends along the edge portion 80 from the corner 82 to the apex 84. A second section 124 of the stitching line 120 includes a series of stitches arranged in a straight line which extends from the apex 84 along the edge portion 86 to the corner 88.

The stitching lines 110 and 120 are closely adjacent to and follow along the end edges 60 and 78 of the panel 40. Thus, the stitching lines 110 and 120 do not extend parallel to the transverse axis 56 of the panel 40 or perpendicular to the longitudinal axis 54 of the panel. The first section 112 of the stitching line 110 extends at approximately a 10° angle to the transverse axis 56. The second section 114 of the stitching line 110 extends at approximately a 20° angle to the first section 112, and thus at approximately a 10° angle to the transverse axis 56. The stitching line 120 is formed as a mirror image of the stitching line 110. Thus, the first section 122 of the stitching line 120 extends at approximately a 10° angle to the transverse axis 56. The second section 124 of the stitching line 120 extends at approximately a 20° angle to the stitching line portion 122, and thus at approximately a 10° angle to the transverse axis 56.

Figure 5:
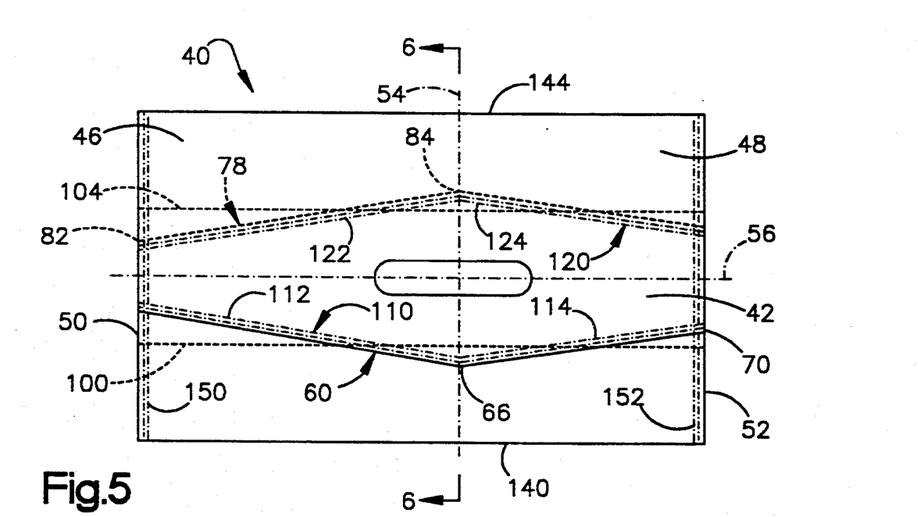
FIG. 5 is a view similar to FIG. 3 showing the panel after subsequent steps of tucking in the panel end portions and sewing the panel side portions.
Figure 6:
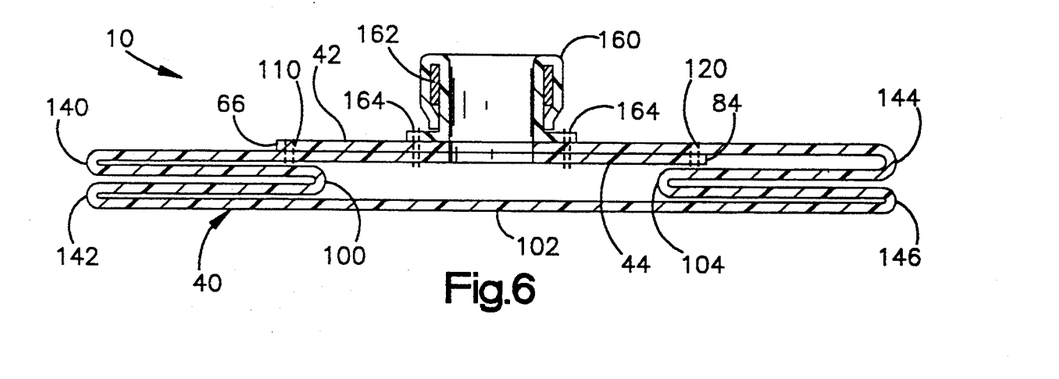
FIG. 6 is a sectional view taken along line 6—6 of FIG. 5 and also showing an attachment panel and retaining ring connected with the panel of FIG. 5.

The upper and lower ends (as viewed in FIG. 3) of the panel 40 are next tucked inward toward the inflation fluid openings 72 and 90, in a manner as seen in FIGS. 5 and 6. The material of the panel 40 at the fold line 104 is moved into the space inside the folded panel 40. This forms two additional fold lines or tuck lines 144 and 146 (FIG. 6). In a similar manner, the material of the panel 40 at the fold line 100 is moved into the space inside the folded panel. This forms two additional fold lines or tuck lines 140 and 142.

The sides of the folded panel 40 are next sewn together. The left side portion 46 (FIG. 5) of the panel 40 is sewn with a double needle stitching line 150 including a series of stitches arranged in a straight line which extends between the tuck lines 140 and 142 at one end of the panel 40 and the tuck lines 144 and 146 at the other end of the panel 40. In the same manner, the right side portion 48 of the panel 40 is sewn with a double needle stitching line 152 including a series of stitches arranged in a straight line which extends between the tuck lines 140 and 142 at one end of the panel 40 and the tuck lines 144 and 146 at the other end of the panel 40. If desired, extra stitching may be provided in the areas with extra layers of material, i.e., the tucked portions of the panel 40.

A tubular attachment panel 160 (FIG. 6) and a retaining ring 162 are then connected with the panel 40. The attachment panel 160 is sewn to the panel end portions 42 and 44 as indicated schematically at 164. The attachment panel 160 encircles the retaining ring 162 and secures the retaining ring to the panel 40. Any other suitable means for securing the panel 40 in the module 16 may be used.

The air bag 10 is then folded side-to-side as illustrated sequentially in FIGS. 7–18. In FIGS. 7–18 certain elements such as section lines for the fabric layers, the end edges 60 and 78 of the panel 40, and the side stitching lines 150 and 152, are not shown, for clarity. Also, it should be understood that the air bag 10 as illustrated in FIGS. 7–18 is reversed in orientation from its position illustrated in FIGS. 5 and 6. That is, the attachment panel 160 and the retaining ring 162 (FIGS. 6 and 8) are illustrated as being disposed on the underside (as viewed in FIG. 8) of the folded panel 40.

Figure 7:
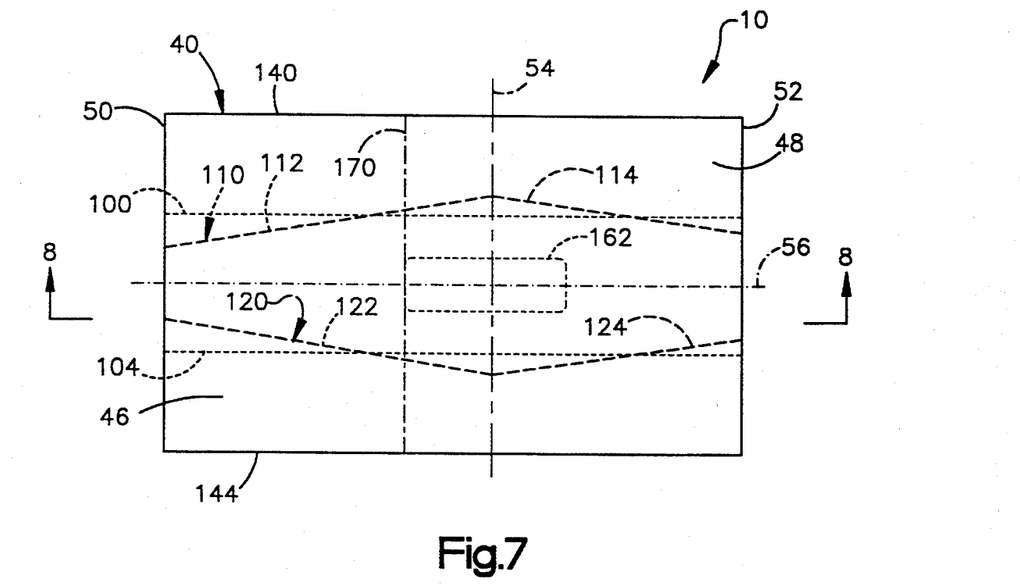
FIG. 7 is a simplified view of the air bag as illustrated in FIG. 5 at the commencement of a side-to-side folding process.
Figure 8:
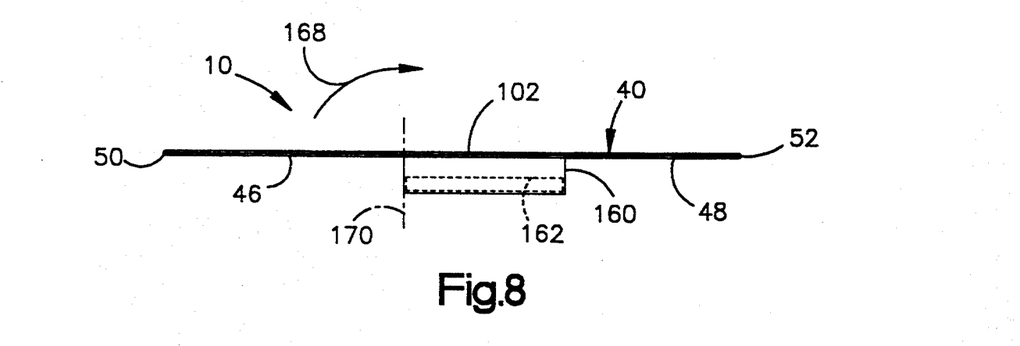
FIG. 8 is a sectional view taken along line 8—8 of FIG. 7 and with section lines omitted for clarity.
Figure 9:
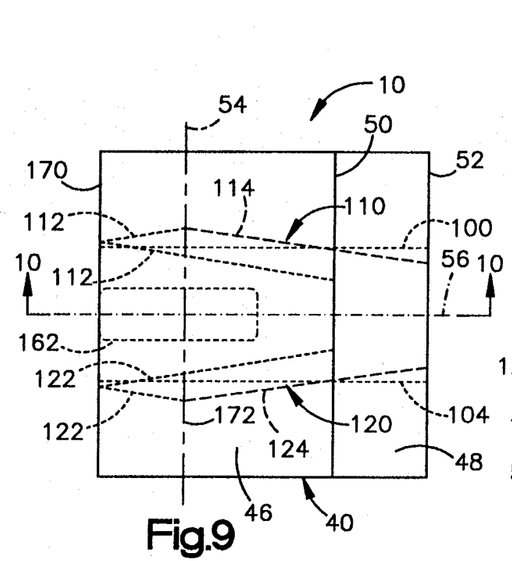
FIG. 9 is a view similar to FIG. 7 showing the first step in the side-to-side folding process.
Figure 10:
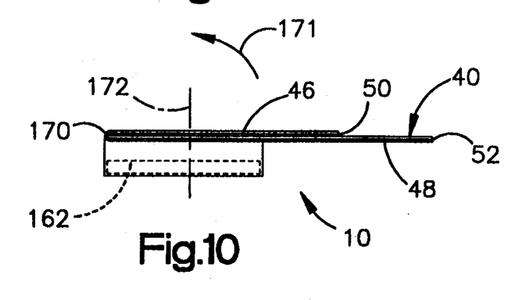
FIG. 10 is a sectional view taken along line 10—10 of FIG. 9 and with section lines omitted for clarity.
Figure 11:
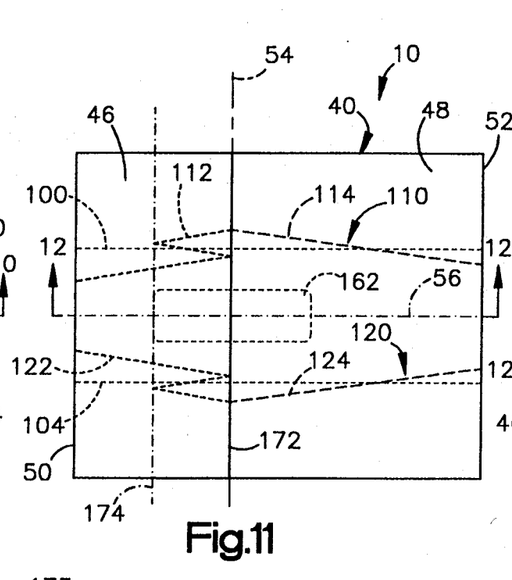
FIG. 11 is a view similar to FIG. 9 showing another step in the side-to-side folding process.
Figure 12:
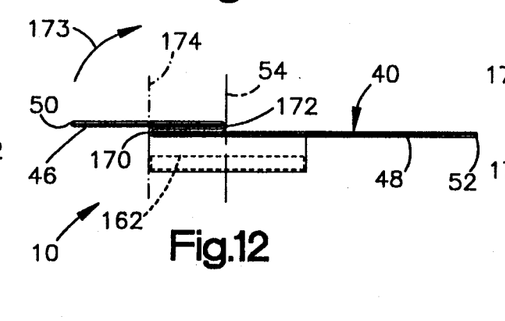
FIG. 12 is a sectional view taken along line 12—12 of FIG. 11 and with section lines omitted for clarity.
Figure 13:
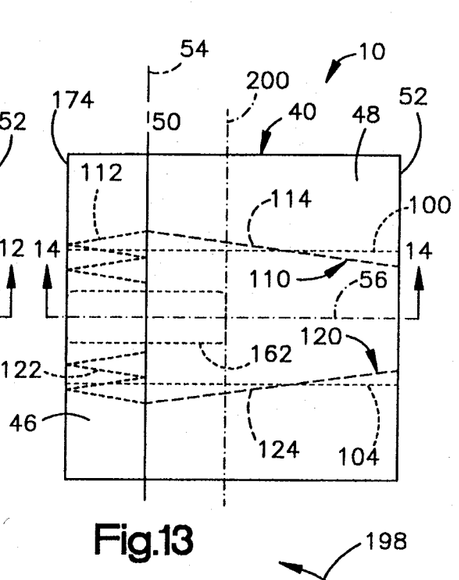
FIG. 13 is a view similar to FIG. 11 showing a still further step in the side-to-side folding process.
Figure 14:
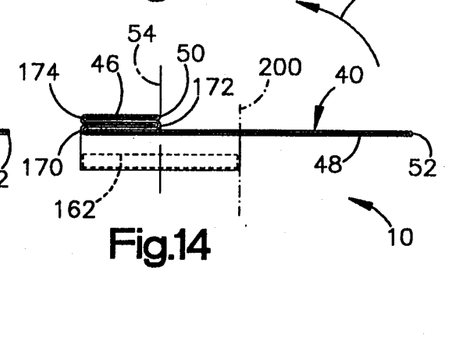
FIG. 14 is a sectional view taken along line 14—14 of FIG. 13 and with section lines omitted for clarity.
Figure 15:
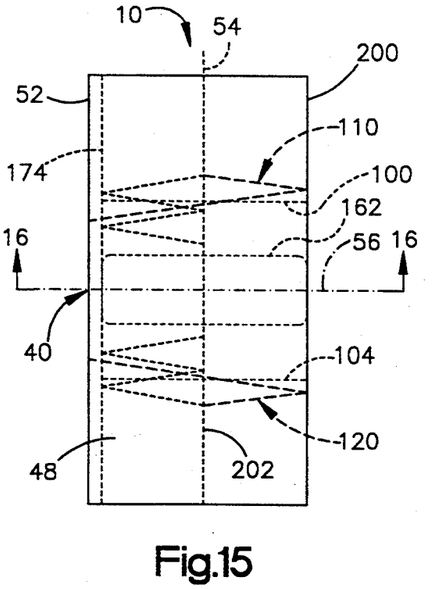
FIG. 15 is a view similar to FIG. 13 showing yet a further step in the side-to-side folding process.
Figures 16, 18:
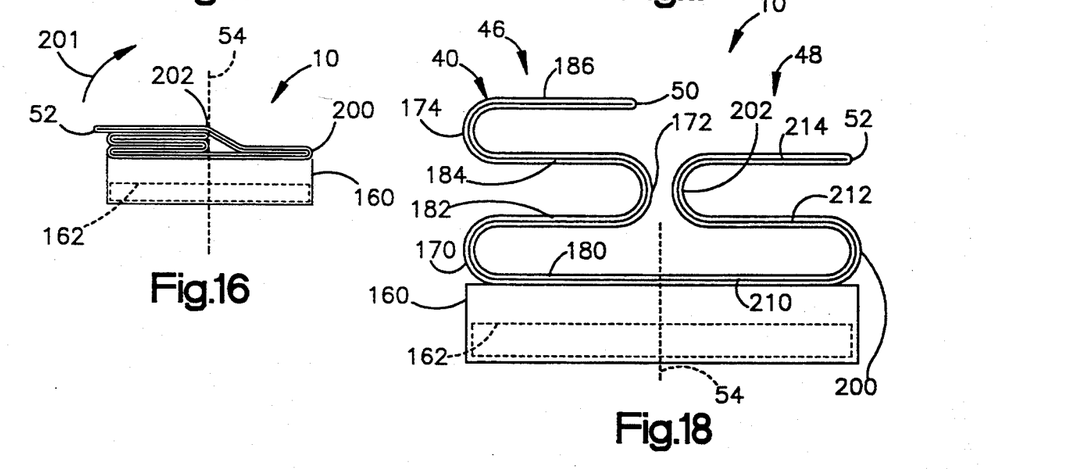
FIG. 16 is a sectional view taken along line 16—16 of FIG. 15 and with section lines omitted for clarity.
FIG. 18 is a schematic sectional view taken along line 18—18 of FIG. 17 and with section lines omitted for clarity.
Figure 17:
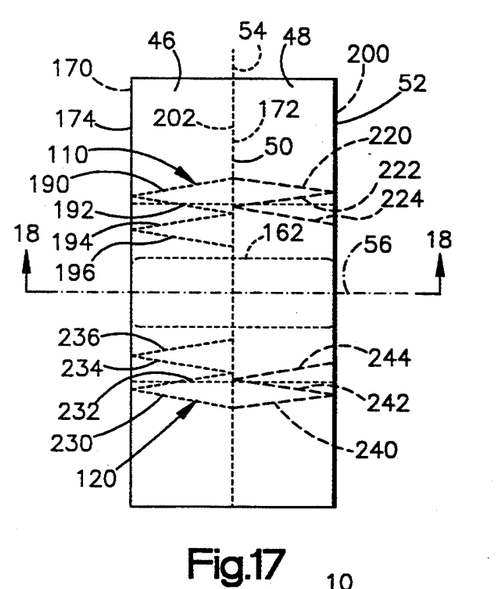
FIG. 17 is a view similar to FIG. 15 showing the air bag upon completion of the side-to-side folding process.

The left side portion 46 of the air bag 10, which is to the left of the longitudinal axis 54 as viewed in FIG. 7, is first folded side-to-side in a three-step folding process as illustrated sequentially in FIGS. 7–14. In the first step of this process, the panel 40 is folded in the direction indicated by the arrow 168 (FIG. 8) along a fold line 170 at the left edge (as viewed in FIGS. 7 and 8) of the retaining ring 162. The fold line 170 extends parallel to the longitudinal axis 54 and perpendicular to the transverse axis 56. As a result of this first folding step, the air bag 10 is in the condition shown in FIGS. 9 and 10. The left side portion 46 and the left side edge 50 (FIG. 9) of the panel 40 are disposed over the right side portion 48 of the panel.

Next, the left side portion 46 of the air bag 10 is folded in the direction indicated by the arrow 171 (FIG. 10) along a fold line 172 which is coincident with the longitudinal axis 54. The fold line 172 extends perpendicular to the transverse axis 56. The air bag 10 is then in the condition shown in FIGS. 11 and 12. The left side portion of the air bag 10 is further folded in the direction indicated by the arrow 173 (FIG. 12) along a fold line 174 at the left edge (as viewed in FIGS. 11 and 13) of the retaining ring 162. The fold line 174 extends perpendicular to the transverse axis 56. The parts of the air bag 10 are then in the condition shown in FIGS. 13 and 14. The left side edge 50 of the panel 40 is disposed approximately coincident with the longitudinal axis 54.

The side-to-side folding of the left side portion 46 of the air bag 10 forms a group of folded portions 180, 182, 184 and 186 (FIG. 18) of the panel 40 which are disposed on one side (to the left as viewed in FIG. 18) of the longitudinal axis 54. The folded portions 180–186 are for clarity illustrated spaced apart and at an enlarged scale in FIG. 18. The folded portions 180–186 are in practice disposed in overlying relationship with each other and in abutting engagement with each other.

The fold lines 170, 172, and 174 intersect the first stitching line 110 at an angle other than 90°. Thus, the side-to-side folding of the left side portion 46 of the air bag 10 forms a group of folded portions of the first stitching line 110. These folded portions of the first stitching line 110 are disposed on one side (to the left as viewed in FIG. 17) of the longitudinal axis 54. The folded portions of the first stitching line 110 are not in overlying relationship with each other, but are spaced from each other. This spaced apart relationship arises because the stitching line 110 extends at an acute angle to the transverse axis 56 and thus is folded in a Z-shaped or zig-zag configuration.

Specifically, the fold lines 170, 172, and 174 divide the section of the first stitching line 110 which is disposed to the left of the longitudinal axis 54 as viewed in FIGS. 7–18 into a plurality of contiguous portions. A first portion 190 (FIG. 17) of the first stitching line 110 extends between the longitudinal axis 54 and the fold line 170. A second portion 192, which is contiguous with the first portion 190, extends between the fold line 170 and the fold line 172 and, as viewed in FIG. 17, forms a 20° angle with the first portion 190. A third portion 194, which is contiguous with the second portion 192, extends between the fold line 172 and the fold line 174 and, as viewed in FIG. 17, forms a 20° angle with the second portion 192. A fourth portion 196, which is contiguous with the third portion 194, extends between the fold line 174 and the left side edge 50 of the panel 40 and, as viewed in FIG. 17, forms a 20° angle with the third portion 194. Because the portions 190–196 of the stitching line 110 extend at an angle to each other, they are not in overlying relationship with each other and are spaced apart from each other.

The side-to-side folding of the left side portion of the air bag 10 similarly divides the second stitching line 120 (FIG. 17) into a series of interconnected folded portions which are not in overlying relationship with each other and which are spaced apart from each other. Specifically, a first portion 230 of the stitching line 120 extends between the longitudinal axis 54 and the first fold line 170. A second portion 232, which is contiguous with the first portion 230, extends between the fold line 170 and the fold line 172 and, as viewed in FIG. 17, forms a 20° angle with the first portion 230. A third portion 234, which is contiguous with the second portion 232, extends between the fold line 172 and the fold line 174 and, as viewed in FIG. 17, forms a 20° angle with the second portion 232. A fourth portion 236, which is contiguous with the third portion 234, extends between the fold line 174 and the side edge 50 and, as viewed in FIG. 17, forms a 20° angle with the third portion 234. Each of the portions 230–236 extends at an angle to its adjacent portions. Thus, the folded portions 230–236 of the stitching line 120 are not in overlying relationship and are spaced apart from each other.

The portion 48 of the air bag 10 which is disposed to the right of the longitudinal axis 54 as viewed in FIG. 7 is folded side-to-side in a two-step folding process as illustrated sequentially in FIGS. 14–18. In the first step of this process, the right side portion 48 of the air bag 10 is folded in the direction indicated by the arrow 198 (FIG. 14) along a fold line 200 at the right edge (as viewed in FIGS. 14 and 15) of the retaining ring 162. The fold line 200 extends parallel to the longitudinal axis 54 and perpendicular to the transverse axis 56. The air bag 10 is then in the condition shown in FIGS. 15 and 16 with the right side portion 48 overlying the folded left side portion 46. The right side edge 52 of the panel 40 is disposed slightly to the left of the folded left side portion 46 of the air bag 10.

The air bag 10 is next folded in the direction indicated by the arrow 201 (FIG. 16) along a fold line 202 which is coincident with the longitudinal axis 54. The fold line 202 extends perpendicular to the transverse axis 56. The air bag 10 is then in the condition shown in FIGS. 17 and 18. The right side edge 52 of the panel 40 is disposed at the right edge (as viewed in FIG. 17) of the retaining ring 162.

The side-to-side folding of the right side portion 48 of the air bag 10 forms a group of folded portions 210, 212 and 214 of the panel 40 which are disposed on one side (to the right as viewed in FIGS. 17-18) of the longitudinal axis 54. The folded portions 210-214 are for clarity shown separated from each other and enlarged in scale in FIG. 18. The folded portions 210-214 are, in practice, disposed in overlying relationship with each other and in abutting engagement with each other.

The fold lines 200 and 202 intersect the first stitching line 110. Thus, the side-to-side folding of the right side portion 48 of the air bag 10 forms a group of folded portions of the first stitching line 110 which are disposed on one side (to the right as viewed in FIGS. 17-18) of the longitudinal axis 54. The folded portions of the first stitching line 110 are not in overlying relationship with each other but are spaced apart from each other. This spaced apart relationship arises because the fold lines 200 and 202 extend at an angle other than 90° to intersect the stitching line 110 and thus give the right side portion of the stitching line 110 a Z-shaped or zig-zag configuration when folded.

Specifically, the fold lines 200 and 202 divide the section 114 of the stitching line 110 (FIG. 17) which is to the right of the longitudinal axis 54 into a plurality of contiguous portions. A first portion 220 extends between the longitudinal axis 54 and the fold line 200. A second portion 222, which is contiguous with the first portion 220, extends between the fold line 200 and the fold line 202 and, as viewed in FIG. 17, forms a 20° angle with the first portion 220. A third portion 224, which is contiguous with the second portion 222, extends between the fold line 202 and the right side edge 52 of the panel 40 and, as viewed in FIG. 17, forms a 20° angle to the second portion 222. Because the portions 220-224 extend at an angle to each other, they are not in overlying relationship with each other and are spaced apart from each other.

The side-to-side folding of the right side portion of the air bag 10 similarly divides the second section 124 of the second stitching line 120 (FIG. 17) into a series of interconnected folded portions which are not in overlying relationship with each other and which are spaced apart from each other. A first portion 240 extends between the longitudinal axis 54 and the first fold line 200. A second portion 242, which is contiguous with the first portion 240, extends between the fold lines 200 and 202 and, as viewed in FIG. 17, forms a 20° angle with the first portion 240. A third portion 244, which is contiguous with the second portion 242, extends between the fold line 202 and the right side edge 52 of the panel 40 and, as viewed in FIG. 17, forms at a 20° angle with the second portion 242. Each of the portions 240-244 of the second stitching line 120 extends at an angle to its adjacent portions. As a result, the folded portions 240-244 of the stitching line 120 are not in overlying relationship with each other and are spaced from each other.

Figure 19:
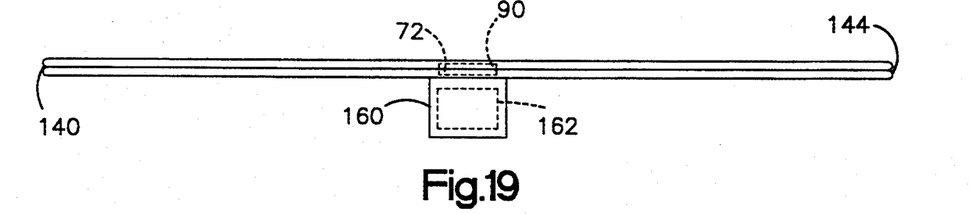
FIG. 19 is a schematic side elevational view of the folded air bag of FIG. 18.

Finally, the air bag 10 is folded top-to-bottom as indicated schematically in FIGS. 1 and 19, to fit within the housing 12. It should be understood that FIG. 1 represents only schematically the folded condition of the air bag 10. The air bag 10 is, in practice, tightly folded and packed to fill the space available in the housing 12. This top-to-bottom folding does not form a part of the present invention and therefore is not described further herein.

As noted above, the stitching lines 110 and 120 are folded into portions which are not in overlying relationship with each other and which are spaced apart from each other. Thus, the folded air bag 10 is thinner than it would be if the various folded portions of the stitching lines 110 and 120 were in overlying relationship with each other and were not spaced apart from each other. This minimizes the thickness of the folded air bag 10 in the housing 12.

It should be understood that in other air bags constructed in accordance with the present invention, the end edges of the panel from which the air bag is made might extend at different angles to the axes of the air bag. The stitching lines which join the end portions of such an air bag would, in that case, preferably follow along the end edges of that panel and thus extend at similar angles. Alternatively, the upper and lower end edges of a panel of an air bag constructed in accordance with the present invention might extend parallel to the transverse axis of the air bag. In that case, the stitching lines would extend at an angle to the end edges.

From the above description of the invention, those skilled in the art will perceive improvements, changes and modifications in the invention. For example, a plurality of pieces of fabric material might be sewn together to form either the panel 40 or an air bag in accordance with the present invention. Such improvements, changes and modifications within the skill of the art are intended to be covered by the appended claims.

Having described the invention, we claim:

1. An inflatable restraint for use with a source of inflation fluid and for, when inflated, restraining a passenger of a vehicle, said restraint comprising:

a panel of fabric material having first and second opposite end portions and first and second opposite side portions;

said panel being folded along spaced apart first fold lines such that said first end portion of said panel overlies said second end portion, a first stitching line joining said first and second end portions of said panel;

said panel including said first stitching line being folded along spaced apart second fold lines extending at an angle other than 90° to said first stitching line, said second fold lines also defining a plurality of folded portions of said panel which overlie each other and are in abutting engagement with each other, said second fold lines also defining a plurality of folded portions of said first stitching line which are spaced apart from and not in overlapping alignment with each other.

2. An inflatable restraint as set forth in claim 1 wherein said first stitching line includes a first section and a second section extending at an angle to said first section, each of said first and second sections of said first stitching line extending at an angle other than 90° to said second fold lines.

3. An inflatable restraint as set forth in claim 1 further comprising a second stitching line joining said first and second end portions of said panel at a location spaced apart from said first stitching line, said second stitching line extending at an angle other than 90° to said second fold lines.

4. An inflatable restraint as set forth in claim 3 wherein said panel has a plurality of outer peripheral edges including a first end edge at least partially defining said first end portion, a second end edge at least partially defining said second end portion, and opposite side edges extending between and interconnecting said first and second end edges, said first stitching line being disposed adjacent to said first end edge, said second stitching line being disposed adjacent to said second end edge.

5. An inflatable restraint as set forth in claim 1 further including a first inflation fluid opening in said first end portion and a second inflation fluid opening in said second end portion in overlapping alignment with said first inflation fluid opening when said first end portion of said panel overlies said second end portion;
   said panel having a longitudinal axis extending through said aligned openings;
   said second fold lines defining a first group of said plurality of folded portions of said first stitching line disposed on one lateral side of said longitudinal axis and a second group of said plurality of folded portions of said first stitching line disposed on another lateral side of said longitudinal axis.

6. An inflatable restraint as set forth in claim 1 wherein said plurality of folded portions of said first stitching line form a Z-shaped configuration having a plurality of interconnected portions including a first portion and a second portion which is contiguous with said first portion and which forms an acute angle with said first portion.

7. An inflatable restraint as set forth in claim 1 wherein said panel has a transverse axis extending generally parallel to said first fold lines and a longitudinal axis extending generally perpendicular to said transverse axis, said longitudinal axis intersecting said first stitching line and dividing said first stitching line into first and second sections, a first group of said second fold lines dividing said first section of said first stitching line into a first series of contiguous portions disposed on a first lateral side of said longitudinal axis, a second group of said second fold lines dividing said second section of said first stitching line into a second series of contiguous portions disposed on a second lateral side of said longitudinal axis.

8. An inflatable restraint as set forth in claim 1 wherein said panel has a generally rectangular configuration including first and second opposite side edges and first and second opposite end edges extending between and interconnecting said first and second side edges, said panel having a longitudinal axis disposed intermediate and extending generally parallel to said first and second side edges, said second fold lines extending generally parallel to said longitudinal axis and generally parallel to said first and second side edges.

9. An inflatable restraint as set forth in claim 8 wherein said plurality of folded portions of said first stitching line extend in a first Z-shaped configuration from said first side edge to said longitudinal axis and in a second Z-shaped configuration from said longitudinal axis to said second side edge.

10. An inflatable restraint as set forth in claim 1 wherein said folded portions of said panel include a first group of said folded portions of said panel forming said first side portion and a second group of said folded portions of said panel forming said second side portion and disposed at a location spaced apart from said first group of said folded portions of said panel.

11. An inflatable restraint as set forth in claim 10 wherein each one of said first group of said folded portions of said panel includes a respective one of said plurality of folded portions of said first stitching line, each one of said second group of said folded portions of said panel also including a respective one of said plurality of folded portions of said first stitching line.

12. An inflatable restraint for use with a source of inflation fluid and for, when inflated, restraining a passenger of a vehicle, said restraint comprising:
   a generally rectangular panel of fabric material having first and second opposite side edges which extend generally parallel to each other and first and second opposite end edges which extend between said side edges, said panel having first and second opposite side portions and first and second opposite end portions;
   said panel being folded and said first end portion of said panel overlying said second end portion;
   a first stitching line joining said overlying first and second end portions of said panel, said first stitching line extending between said first and second side edges in a direction generally parallel to said first and second end edges;
   said panel including said first stitching line being folded along spaced apart fold lines defining a plurality of folded portions of said panel which overlie each other and which are in abutting engagement with each other, each of said fold lines intersecting said first stitching line at an angle other than 90° to define a plurality of folded portions of said first stitching line which are spaced apart from and not in overlapping engagement with each other.

13. An inflatable restraint as set forth in claim 12 wherein said panel has a transverse axis which extends between and generally perpendicular to said side edges, at least a portion of said first end edge extending at an acute angle to said transverse axis of said panel.

14. An inflatable restraint as set forth in claim 12 wherein said folded portions of said first stitching line are contiguous with each other, adjacent ones of said folded portions of said first stitching line extending at an angle other than 90° to each other and being arranged in a Z-shaped configuration.

15. An inflatable restraint as set forth in claim 12 wherein said side edges of said panel are substantially longer than said end edges of said panel.

16. An inflatable restraint as set forth in claim 12 wherein said panel has a longitudinal axis which extends between said end edges of said panel, said plurality of folded portions of said panel including a first group of folded portions of said air bag which are disposed on one lateral side of said longitudinal axis and a second group of folded portions of said air bag which are disposed on another lateral side of said longitudinal axis, each one of said folded portions of said air bag in said first and second groups including at least one of said folded portions of said first stitching line.

* * * * *